Nov. 4, 1924.
C. R. LOTT
1,514,091
METHOD AND APPARATUS FOR FLOWING MOLTEN GLASS
Original Filed Sept. 27, 1909
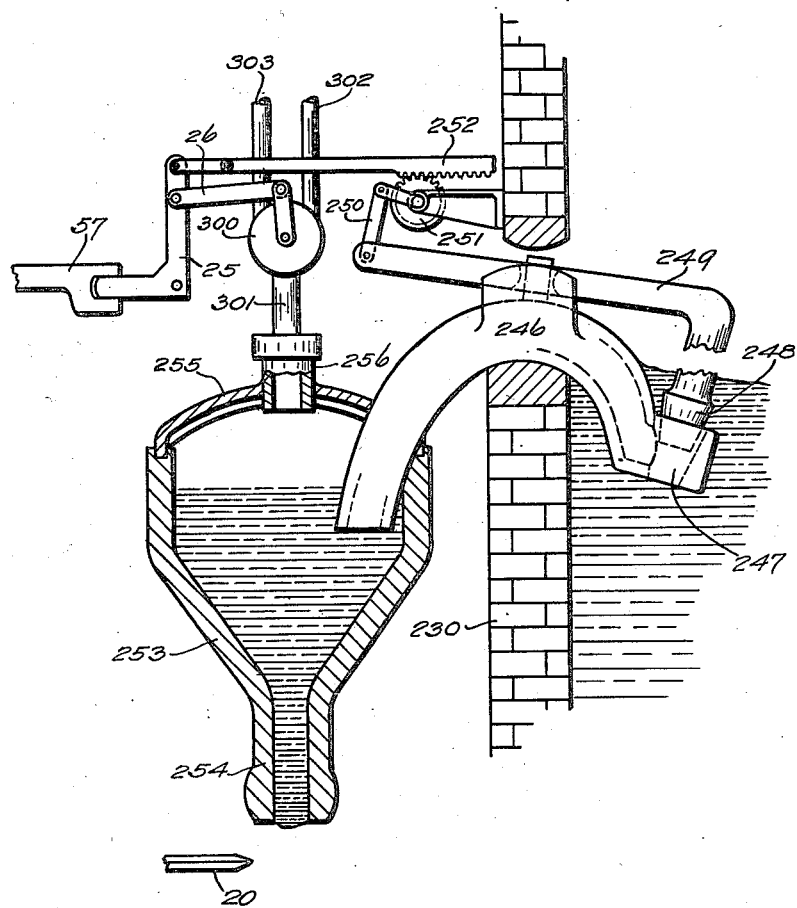
WITNESS
Leonard Soubier
INVENTOR
Clyde R. Lott,
By J. F. Rule,
His attorney.

Patented Nov. 4, 1924.

1,514,091

UNITED STATES PATENT OFFICE.

CLYDE R. LOTT, OF WASHINGTON, DISTRICT OF COLUMBIA, ASSIGNOR, BY MESNE ASSIGNMENTS, TO THE OWENS BOTTLE COMPANY, A CORPORATION OF OHIO.

METHOD AND APPARATUS FOR FLOWING MOLTEN GLASS.

Original application filed September 27, 1909, Serial No. 519,678. Divided and this application filed March 15, 1920. Serial No. 365,785.

*To all whom it may concern:*

Be it known that I, CLYDE R. LOTT, a citizen of the United States, residing at Washington, in the District of Columbia, have invented new and useful Improvements in Methods and Apparatus for Flowing Molten Glass, of which the following is a specification.

My invention relates to apparatus for flowing molten glass and separating it into individual masses or charges for use in making bottles or other glass articles.

This application is a division of my co-pending application, Serial Number 519,678, filed September 27, 1909.

In the accompanying drawings, the figure is a part sectional elevation of the apparatus.

The molten glass is supplied from a tank 230. A charger 253 is provided with a siphon intake 246, whose tank opening 247 is normally closed by a plug 248 on one of the arms of an angle lever 249, whose other end is adapted to be engaged by a link 250 connected to a crank on a pinion 251 connected by a rack 252 and a link to an elbow lever 25 which is operated by a lever 57. The lever 57 may be one of a series of levers comprising part of a glass forming machine and which are successively brought into position to engage the bell crank 25 and operate it, as fully set forth in the co-pending application above referred to.

The outer end of the siphon delivers into the closed funnel shaped cup or charger 253 having an outlet pipe 254 at its bottom and closed at its top by a removable cover 255, through which extends the adjacent end of an air pipe 256 connected with a pipe 301 leading to a three way valve 300. This valve is operatively connected through a link 26 to the bell crank 25. The valve is connected through pipes 302 and 303 with a source of fluid pressure and with an exhausting device respectively.

In operation the lever 57 is periodically moved downward, and through the connection shown, lifts the valve 248. The same movement of the lever 57 opens the valve 300 to the vacuum pipe 303, thereby partially exhausting the air above the glass in the chamber 253. While the valve 248 is open glass flows into said chamber. The lever 57 then moves upward closing the valve 248 and opening the three way valve to the pressure pipe 302 so that air pressure is admitted above the glass in the charger. The glass under the influence of gravity and the air pressure flows downward through the outlet 254. A pair of shears 20 operates periodically in synchronism with the valve operations to sever the charges of glass at a point a short distance below the spout 254. The cutting operation is timed to take place while the vacuum is applied and the flow retarded, all as set forth in the co-pending application above referred to.

Certain features of invention herein disclosed and not claimed are made the subject-matter of claims in additional applications, and in this connection attention is directed, for instance, to my copending application Serial No. 244,684, filed July 13, 1918.

Attention is also directed to my copending application, Serial Number 259,419, filed October 23, 1918.

Modifications may be resorted to within the spirit and scope of my invention.

What I claim is:

1. The combination of a container for molten glass, means to receive the glass, a siphon to transfer the glass from said container to the receiving means, a valve positioned within the glass in said container and controlling the flow through the siphon, and positive means to periodically actuate the valve.

2. The combination of a receptacle to contain molten glass, a second receptacle, a siphon arranged with its ends beneath the surface of the glass in the respective receptacles, valve mechanism controlling the flow of glass through the siphon, comprising a valve to close the siphon, and means connected to the valve and automatically operated periodically to open and close the valve.

3. The method which consists in siphoning molten glass from a pool into a closed container having a continuously open outlet below the level of the glass in the container, and periodically increasing and decreasing the pressure on the glass in the container alternately above and below atmospheric pressure and thereby discharging predetermined charges of glass through the outlet.

4. The method which consists in siphoning molten glass from a pool into a closed container having a continuously open outlet below the level of the glass in the container, applying a periodic pressure to the glass in the container and thereby discharging predetermined charges of glass through the outlet, causing the glass to be supported by atmospheric pressure at said opening and thereby preventing it from discharging when said periodic pressure is withdrawn, and periodically interrupting the flow through the siphon in synchronism with said periodic pressure.

5. The method which consists in siphoning molten glass from a pool into a closed container having a continuously open outlet below the level of the glass in the container, applying a periodic pressure to the glass in the container and thereby discharging predetermined charges of glass through the outlet, causing the glass to be supported by atmospheric pressure at said opening and thereby preventing it from discharging when said periodic pressure is withdrawn, periodically interrupting the flow through the siphon in synchronism with said periodic pressure, and severing the charges from the glass issuing from the outlet.

6. The combination with a tank to contain molten glass, of a closed receptacle outside the tank, a siphon for conveying glass into said receptacle arranged with its ends respectively immersed in the glass in the tank and said receptacle, and automatic means for periodically applying pressure and vacuum alternately to the glass in said receptacle.

7. The combination with a tank to contain molten glass, of a closed receptacle outside the tank, a siphon arranged with its ends respectively in the tank and said receptacle for conveying glass into said receptacle, and automatic means for intermittently increasing and decreasing the air pressure within the receptacle alternately above and below atmospheric pressure.

8. The combination with a tank to contain molten glass, of a closed receptacle outside the tank, a siphon arranged with its ends respectively in the tank and said receptacle for conveying glass into said receptacle, and automatic means to periodically reduce the air pressure on the surface of the glass in said receptacle below atmospheric pressure.

9. The combination with a tank to contain molten glass, of a closed receptacle outside the tank, a siphon arranged with its ends respectively in the tank and said receptacle for conveying glass into said receptacle, and means to periodically apply pressure and vacuum alternately in the receptacle above the glass.

10. The combination of a container for molten glass, a receptacle, a siphon arranged to convey glass from said container into the receptacle, said siphon having its ends beneath the surface of the glass in said container and receptacle, a valve immersed in the glass in said receptacle and controlling the flow through said siphon, and automatic means to periodically actuate said valve.

11. The combination of a container for molten glass, a receptacle, a siphon arranged to convey glass from said container into the receptacle, said siphon having its ends beneath the surface of the glass in said container and receptacle, a valve immersed in the glass in said receptacle and controlling the flow through said siphon, automatic means to periodically actuate said valve, means to control the air pressure on the glass within said container including a valve, and connections between said valves whereby they are operated in synchronism.

12. The combination of a tank to contain molten glass, a charging vessel exterior to the tank and provided with a discharge outlet, a siphon arranged to convey glass from the tank to said vessel, means to periodically vary the air pressure on the glass within said vessel including a valve, a valve controlling the flow of glass through the siphon, and automatic means for simultaneously opening and closing said valves.

13. The combination of a tank to contain molten glass, a charging vessel having a discharge outlet, a siphon to convey glass from the tank to the charging vessel, a valve to open and close the siphon, means to periodically actuate the valve, and automatic means to effect an increase in the air pressure on the glass in said vessel when the siphon is closed and to decrease said pressure when the siphon is opened.

14. The combination of a tank to contain molten glass, a charging vessel having a discharge outlet, a siphon to convey glass from the tank to the charging vessel, a valve to open and close the siphon, means to periodically actuate the valve, automatic means to effect an increase in the air pressure on the glass in said vessel when the siphon is closed and to decrease said pressure when the siphon is opened, and a cutter operable in synchronism with the movements of said valve to sever the glass issuing from said outlet and thereby produce individual masses or charges.

15. The combination of a container for molten glass, a receptacle, a siphon arranged to convey glass from said container into the receptacle, a valve immersed in the glass in said container and controlling the flow through said siphon, and automatic means to periodically actuate said valve.

16. The method of producing charges of molten glass which consists in causing at regular intervals a periodic projection of molten glass upward and outward from a supply tank and directing it into a container, applying a periodically variable controlling force to the glass in the container at regular intervals in synchronism with said periodic projections and thereby causing a periodically controlled discharge of glass therefrom, and periodically severing the discharged glass.

17. The method of producing charges of molten glass which consists in causing at regular intervals a periodic projection of molten glass upward and outward from a supply tank and directing it into a container, periodically applying an expelling force to the glass in the container at regular intervals in synchronism with said periodic projections, and periodically severing the expelled glass.

18. The method of producing charges of molten glass which consists in causing at regular intervals a periodic projection of molten glass upward and outward from a supply tank and directing it into a container, periodically applying an alternate expelling and retarding force to the glass in the container at regular intervals in synchronism with said periodic projections and thereby causing a periodic discharge from the container, and periodically severing the discharged glass.

19. The combination of a tank to contain molten glass having an outlet in the side wall thereof above the normal level of the glass, a container outside of said wall, means to cause a movement of glass from the tank through the outlet and guide it from said outlet into said container, and automatic means operatively associated with said first-mentioned means whereby to cause at regular intervals a periodically controlled discharge of glass from the container.

20. The combination of a tank to contain molten glass having an outlet in the side wall thereof above the normal level of the glass, a container outside of said wall, periodically operable means to cause a movement of the glass from the tank through the outlet and guide it from said outlet into said container, said container having an outlet opening, and controlling means operating periodically on the glass in said container in synchronism with the movements of the glass in the container to cause a periodic discharge therefrom.

21. The combination of a tank to contain molten glass, said tank having an outlet opening above the normal level of the glass in the tank, a charger, automatic means to cause a periodically regulated discharge of glass at regular intervals from the tank through said outlet and into the charger, and means operating periodically in synchronism with the operations of said first mentioned means and at equal intervals to cause a periodically regulated discharge of glass from the charger.

22. The combination of a tank to contain molten glass, said tank having a side wall outlet above the normal level of the glass in the tank, a charging receptacle having an outlet in the base thereof, means operating automaticaly and periodically to control the discharge of glass through the outlet in the receptacle, and means operatively associated with said last-mentioned means for periodically forcing the glass from the tank through its outlet into the receptacle.

23. The combination of a tank to contain molten glass, with a stationary charging receptacle arranged to the side of and whereby to receive the glass from the tank, the tank having an outlet in its side at a point above the normal level of the glass in the tank, means for controlling the discharge of glass from the charging receptacle, means for controlling the discharge of glass from the tank through its outlet into the charging receptacle, and common actuating means for both of said first-mentioned means whereby they operate in synchronism and at stated intervals.

24. The combination of a tank to contain molten glass, a stationary charging receptacle arranged to the side of and whereby to receive the glass from the tank, the tank having an outlet in its side at a point above the normal level of the glass in the tank, means for controlling the discharge of glass from the charging receptacle, means for controlling the discharge of glass from the tank through its outlet into the charging receptacle, common actuating means for both of said first-mentioned means whereby they operate in synchronism and at stated intervals, and shears periodically operating to sever the glass discharged from the charging receptacle.

Signed at Washington, in the District of Columbia, this 3rd day of March, 1920.

CLYDE R. LOTT.